United States Patent [19]

Tanikoshi

[11] 4,023,082
[45] May 10, 1977

[54] SPEED CONTROL CIRCUIT FOR A DC MOTOR HAVING A HALL GENERATOR

[75] Inventor: Kinji Tanikoshi, Kawasaki, Japan

[73] Assignees: Canon Kabushiki Kaisha; Canon Seiki Kabushiki Kaisha, both of Tokyo, Japan; part interest to each

[22] Filed: Dec. 20, 1974

[21] Appl. No.: 534,895

[30] Foreign Application Priority Data

Dec. 26, 1973 Japan .............................. 49-3254
Apr. 26, 1974 Japan .............................. 49-47301
Apr. 26, 1974 Japan .............................. 49-47302
Apr. 26, 1974 Japan .............................. 49-47303

[52] U.S. Cl. ............................ 318/138; 318/254
[51] Int. Cl.² ........................................ H02P 5/06
[58] Field of Search .......................... 318/138, 254

[56] References Cited
UNITED STATES PATENTS

| | | | |
|---|---|---|---|
| 3,864,610 | 2/1975 | Kawamoto | 318/138 X |
| 3,881,142 | 4/1975 | Endo | 318/254 X |
| 3,896,357 | 7/1975 | Tanikoshi | 318/254 |
| 3,898,544 | 8/1975 | Tanikoshi | 318/254 |
| 3,906,320 | 9/1975 | Doemen | 318/138 |
| 3,916,272 | 10/1975 | Grünleitner | 318/254 X |
| 3,942,083 | 3/1976 | Takahashi | 318/254 X |

*Primary Examiner*—B. Dobeck
*Attorney, Agent, or Firm*—Toren, McGeady and Stanger

[57] ABSTRACT

An object of the present invention is to provide a comparator circuit for a control circuit of a Hall motor having a compensation function for correcting variation in reference voltage and in temperature and power source voltage, etc. by impressing an induction voltage which corresponds to the rotation speed of a motor and a reference voltage which corresponds to the reference number of rotation to the both input terminal of a differential type circuit in a control circuit for a Hall motor.

15 Claims, 11 Drawing Figures

SPEED CONTROL CIRCUIT FOR A DC MOTOR HAVING A HALL GENERATOR

BACKGROUND OF THE INVENTION

1. Field of the Invention

The present invention relates to a control device for a Hall element motor, particularly to a control circuit which can obtain a constant speed rotation by controlling the input voltage of a Hall element by the comparative output between a voltage induced at each field winding when the motor is rotated and a constant voltage of reference speed.

2. Description of the Prior Art

In a Hall motor in which the position of a rotor consisting of a permanent magnet is detected by a Hall element for changing over the driving current flowing to each field winding, a method has been effected which detects the voltage induced at each field winding so that the input voltage of each Hall element is controlled thereby. Heretofore, such voltage as corresponding to the rotation speed of a rotor is induced at the above mentioned field winding, and such induction voltage which corresponds to the rotation speed of the rotor, that is, the rotation speed of a motor is detected by a comparator circuit consisting of a switching transistor circuit. Then the switching transistor circuit is reversed when the above mentioned induction voltage reaches a prescribed level or higher for controlling the input current to the hall element thus controlling the driving current flowing to the field winding, thereby a prescribed torque is given to a motor for providing always a constant speed to a motor. In such conventional control circuit, the above mentioned induction voltage is impressed between a base and an emitter of a switching transistor when the rotation speed of a motor is detected by a comparator circuit so that the $V_{BE}$ of the switching transistor is a voltage which corresponds to the reference rotation speed for making comparison. However, as the induction voltage is generated in a form which is overlapped with power source voltage, when the power source voltage varies by some reason, even if the induction voltage is kept constant, the voltage impressed to the base-emitter of the switching transistor varies. Therefore, not only is there a difficulty that correct comparison can not be made, but the $V_{BE}$ of the transistor itself varies against the change in temperature thus correct speed control can not be effected.

SUMMARY OF THE PRESENT INVENTION

An object of the present invention is to provide a comparator circuit for a control circuit of a Hall motor having a compensation function for correcting the variation in reference voltage and in temperature and power source voltage, etc. by impressing an induction voltage which corresponds to the rotation speed of a motor and such reference voltage which corresponds to the reference number of rotation to both input terminals of a differential type circuit in a control circuit for a Hall motor.

A further object of the present invention is to provide a comparator circuit for a Hall motor control circuit having a compensation function for correcting the variation in reference voltage and in temperature and power source voltage, etc., by shifting the level of such induction voltage to the rotation speed of a motor through a constant current circuit and impressing the same to one of the input terminals of a differential type circuit and at the same time impressing a reference voltage which corresponds to the reference number of rotation to the other input terminal through a constant voltage circuit, in a control circuit of Hall motor.

Still a further object of the present invention is to provide a comparator circuit for a Hall motor control circuit which can make correct voltage comparison by impressing such induction voltage which corresponds to the rotation speed of a motor to the input terminal of a differential type circuit constituting a comparator circuit through a smoothing circuit so that the stable induction voltage from which ripple contained in the induction voltage is removed is made a value which corresponds to the rotation speed of a motor.

Still another object of the present invention is to provide a comparator circuit of a control circuit for a Hall motor in which an input circuit to generate such voltage which corresponds to the reference rotation speed of the motor and an input circuit to output such voltage which corresponds to the rotation speed of the motor being generated at a field winding are provided, and the output terminals of the input circuits are connected to a differential type amplification circuit, and at the same time driving voltage and reference voltage are impressed to the input circuits and differential amplification circuit by a constant voltage source connected to poles which are connected to power source of the field winding so that the effect of the variation in power source is compensated.

Further objects of the present invention will become apparent by concrete examples of the present invention which are to be explained in detail below.

Figure 1:
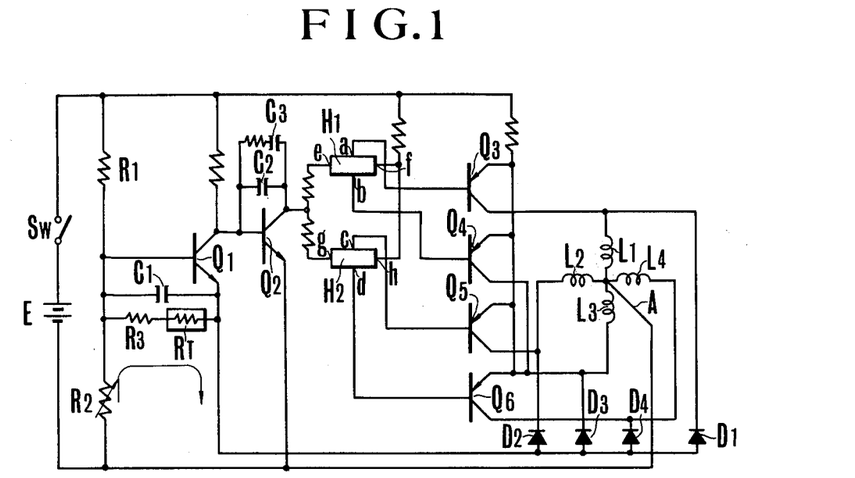
FIG. 1 is a circuit diagram to show an example of a conventional Hall motor control circuit.
Figure 2A:
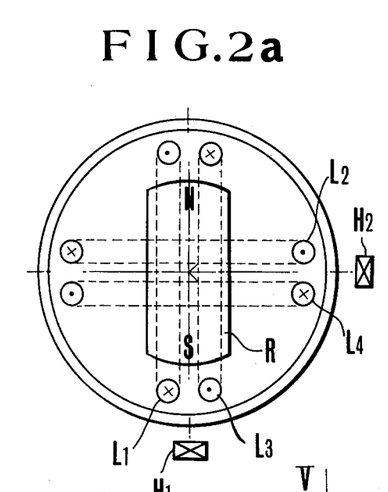
FIG. 2(a) is a cross-sectional view to show the arrangement of a Hall motor.

DESCRIPTION OF THE PREFERRED EMBODIMENTS:

FIG. 1 is a circuit diagram to show an example of a conventional Hall motor control circuit. In this drawing, $L_1$ to $L_4$ are field windings of a motor. $H_1$, $H_2$ are hall elements which constitutes a Hall motor together with a rotor shown in FIG. 2. $Q_3$ to $Q_6$ are transistors of a motor driving circuit, wherein each emitter thereof is connected to a power source E and at the same time each collector is connected to the above mentioned field winding. Further, the bases of the transitors $Q_3$ to $Q_6$ are connected to the output terminals, $a$, $b$, $c$, $d$, respectively, of the Hall elements, $H_1$, $H_2$, and are driven individually by the voltage generated at the output terminals of the Hall elements. $D_1$ to $D_4$ are diodes which are connected to each of the field windings, $L_1$ to $L_4$ to detect the induction voltage being generated for synthesis. $R_1$ is a resistance which $R_2$ is a variable resistance, forming a bleeder circuit of the power source E. $Q_1$, $Q_2$ are switching transistors, wherein the base of $Q_1$ is connected to the connecting point of the above mentioned bleeder circuit, and at the same time its collector is connected to the diodes $D_1$ to $D_4$. $R_3$ is a resistance connected between base and emitter of the transistor Q. $R_T$ is a temperature compensation thermister being connected in series with the resistance $R_3$. Also the base of the above mentioned switching transistor $Q_2$ is connected to the collector of $Q_1$ while the emitter thereof is connected to the (−) pole of the power source, and at the same time, the collector thereof is connected to a common connecting point of the input terminals l, G each one of which constitutes one of the two input terminals of the above mentioned Hall elements $H_1$, $H_2$. Also the other input terminals f, H of said Hall elements $H_1$, $H_2$ are connected to (+) pole of the power source E through a resistance. $C_1$, $C_2$, $C_3$ are capacitors to provide smooth switching function for the switching transistors $Q_1$, $Q_2$, and $S_w$ is a power source switch.

FIG. 2(a) is a cross-sectional view to show the set-up of the Hall motor of the Hall motor control circuit shown in FIG. 1, wherein $L_1$ to $L_4$ are field windings shown in FIG. 1, and $H_1$, $H_2$ show hall elements, while R is a rotor consisting of a permanent magnet.

Figure 2B:
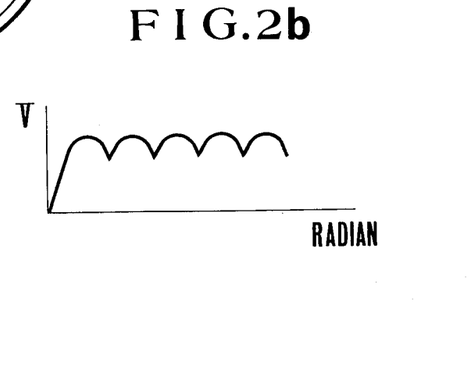
FIG. 2(b) is a wave-form diagram of induction voltage generated at a field winding.

When the power source switch $S_W$ is placed in ON state while the rotor R, the Hall elements, $H_1$, $H_2$ and the field windings $L_1$ to $L_4$ are at the state shown in FIG. 2, the bleeder voltage of the power source E is impressed to the base of the transistor Q through the bleeder circuit consisting of the resistance R, and the variable resistance $R_2$, but as the resistance value of R is pre-set at very small level compared to that of $R_1$, the transistor $Q_1$ becomes OFF, therefore the transistor $Q_2$ becomes ON state. Thus current flows to the Hall elements $H_1$, $H_2$ through their input terminals, f-l-transistor $Q_2$, and H-G-$Q_2$, respectively. Then, since the rotor R and the Hall elements $H_1$, $H_2$ are in the state shown in FIG. 2, alkali voltage is generated which is (−) at the output terminal a of the Hall elements $H_1$, $H_2$, and as being (+) at the output terminal b of the same by the magnetic flux of the rotor. Therefore, the base electric potential of the transistor $Q_3$ is lower than the emitter electric potential, and the transistor $Q_3$ becomes ON. Therefore, driving current flows to the field winding $L_1$ and the rotor R starts rotation to the direction of arrow. Next, as the N pole of the rotor R comes to such position as opposing to the Hall element $H_2$, (−) voltage is generated at its output terminal d while (+) voltage is generated at the terminal c, and the transistor $Q_6$ becomes ON, thus driving current flows to the field winding $L_4$, then the rotor R rotates further to the direction of arrow. Then driving current flows in turn to the field windings $L_3$, $L_2$ and the rotor R continues rotation. As the rotor R rotates magnetic flux and such induction voltage as corresponding to the rotation speed are generated at the field winding at which driving current is not flowing, and they are synthesized by the diodes $D_1$ to $D_4$ and the voltage of FIG. 2(b) is generated at the point A. Therefore, such current as corresponding to the voltage at the point A flows to the resistance $R_3$ through $R_2$-$R_3$-$R_T$-$D_1$ to $D_4$, and the voltage drop is generated by the resistances $R_3$, $R_T$. Since said voltage drop by the resistance $R_3$, $R_T$ becomes bleeder voltage of the voltage at the point A, it becomes such value as corresponding to the rotation speed of the rotor R. In an event when the rotor R is rotated at a speed higher than the prescribed reference rotation speed, the voltage drop by the resistances $R_3$, $R_T$ becomes large and exceeds the $V_{BE}$ of the transistor $Q_1$, therefore $Q_1$ becomes ON, thus the transistor $Q_2$ becomes OFF. As the transistor $Q_2$ becomes OFF, the current supply path to the Hall elements $H_1$, $H_2$ is blocked, and the driving current will not flow to the field windings $L_1$ to $L_4$ as the Hall voltage is not generated, thus the rotation speed of the rotor R becomes slow and is controlled to a constant speed. As has been explained above in a conventional control circuit, when the reference rotation speed and the rotation speed of a motor is compared, comparison is made as the reference voltage of $V_{BE}$ of transistor, therefore not only the comparison transistor needs to have high degree of accuracy, but it has such shortcoming as being susceptible to the effects of temperature and of power source voltage.

Figure 3:
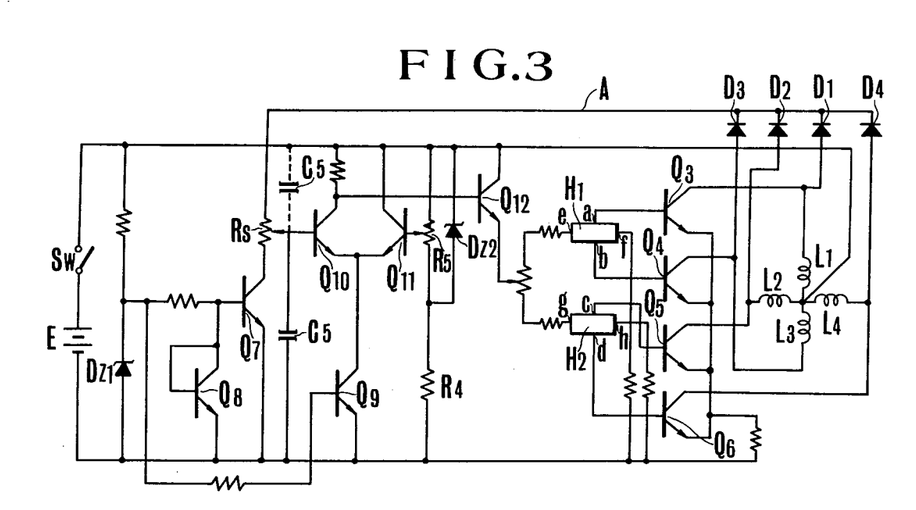
FIG. 3 is a circuit diagram to show an example of a Hall motor control circuit according to the present invention.

FIG. 3 is a circuit diagram to show an example of a Hall motor control circuit according to the present invention, wherein such parts as having same set-ups and operational function as those of the circuit diagram shown in FIG. 1 are identified by same numbers or letters. In FIG. 3, $D_{Z1}$ is a zener diode, $Q_8$ is a transistor constituting a constant voltage circuit and is connected to the base end of the transistor $Q_7$, always impressing constant voltage to said base. $Q_1$ is a transistor and its collector side is connected to the diodes $D_1$ to $D_4$, at which such induction voltage as corresponding to the rotation speed of the motor is generated, through a potentiometer $R_5$, and at the same time the base is connected to the output terminal of a constant voltage circuit consisting of a transistor $Q_{11}$ and a Zener diode $D_{Z1}$, constituting a constant current circuit as mentioned above, for supplying a constant current all the time to the potentiometer $R_5$ for always supplying constant current, and at the same time an input circuit of the motor rotation speed information for a differential amplification circuit which is to be described later. Also the rotation speed can be made to any desired value by varying the resistance value of $R_5$. $D_{z2}$ is a Zener diode, being connected in parallel with the resistance $R_5$ against the power source and is connected in series with the resistance $R_4$, constituting a bleeder circuit of the power source voltage, and at the same time constitutes an input circuit to always impress a constant reference voltage at the input terminal of the reference rotation speed information of a differential amplification circuit to be described later. $Q_{10}$, $Q_{11}$ are transistors constituting a differential amplification circuit, and the base of $Q_{10}$ is connected to the input terminal of the above mentioned potentiometer $R_5$ and such voltage as corresponding to the rotation speed of the rotor is impressed. And the base of $Q_{11}$ is connected to the output terminal of the reference rotation speed information input circuit of a motor consisting of the above mentioned Zener diode $D_{Z2}$, the resistances $R_4$, $R_5$, and such voltage as corresponding to the reference rotation speed of a motor is impressed. $Q_9$ is a transistor for stabilizing the emitter voltage of $Q_{10}$, $Q_{11}$, having its base end connected to the output terminal of the above mentioned Zener diode $D_{z1}$. $Q_{12}$ is an output transistor having its base connected to the collector of the above mentioned transistor $Q_{10}$ and having its emitter connected to the input terminal 1, G of the Hall elements. $C_4$, $C_5$ are capacitors for smoothing.

Next explanations will be made on the function of a hall motor control circuit according to the present invention. When the power source switch $S_W$ is made ON, the transistor $Q_1$ becomes ON, and constant current flows to the potentiometer $R_5$. Then, as the rotor has not started rotation, the induction voltage is not generated and since almost same voltage as the power source voltage E is impressed to the point A, the base electric potential of the transistor $Q_{10}$ becomes lower than the base electric potential of the transistor $Q_{11}$ and the base potential of the transistor $Q_{12}$ becomes high, therefore the transistor $Q_{12}$ becomes ON and current flows to the Hall element. Therefore Hall voltage is generated at the hall elements as shown in detail in FIG. 1, and since the direction of current flowing to the Hall elements in the example shown in FIG. 3 is reverse to that in the example of FIG. 2, (+) electric potential is generated at the output end a of the Hall element $H_1$ in the beginning. Therefore, the transistor $Q_3$ becomes ON and driving current flows to the field winding $L_1$ and the rotor starts rotation. Then the transistors $Q_4$ to $Q_6$ become On in turn and driving current flows in turn to the flux-producing windings $L_2$ to $L_4$ and the rotor keeps rotating.

As the rotor is located such induction voltage as corresponding to the rotation speed of the rotor is generated at the flux-producing windings at which no driving current is flowing and is synthesized by the diodes $D_1$ to $D_4$, and the voltage formed by adding such induction voltage as shown in FIG. 2(b) to the power source voltage is generated at the point A. Then, when the rotor is rotated at the prescribed rotation speed or faster, the induction voltage becomes large, thus the voltage at the point A becomes higher. Therefore, since the base electric potential of the transistor $Q_{10}$ becomes higher than the base electric potential of the transistor $Q_{11}$, and becomes lower than the base electric potential of $Q_{12}$, current decreases and the input current into the Hall elements $H_1$, $H_2$ decreases. Therefore, since the Hall voltage generated at the Hall elements decreases, the driving current flowing to the field windings $L_1$ to $L_4$ decreases, thus the rotation speed of the motor is controlled to a constant level. The reason why the voltage at the point A is made such voltage as corresponding to the rotation speed of the motor through the constant current circuit and the potentiometer $R_5$ in a process to compare the reference voltage corresponding to the above mentioned reference rotation speed and such voltage as corresponding to the rotation speed of the motor is that since the voltage generated at the point A becomes such value as adding the power source voltage and the induction voltage together, it becomes the operating voltage of the differential amplification circuit or higher, it is not suitable as the input voltage of the differential amplification circuit. Thus said voltage has its voltage level shifted for converting the same to such value as being suitable as the input voltage of the differential amplification circuit, and that the voltage corresponding to the variation in the induction voltage is precisely made as the input information. That is when the induction voltage is expressed as $V_m$, such value $E + V_m$ as adding the power source voltage E and Vm together is impressed to the point A, therefore, as the current flowing to the potentiometer $R_5$ is expressed by I, the voltage of $E+V_m-R_5I$ is impressed to the base of the transistor $Q_{10}$. Now, if the value of $V_m$ is doubled, the base electric potential of $Q_{10}$ becomes $E + 2V_m-R_5I$, and the difference in voltage impressed to the base when $V_m$ becomes double will become $V_m$ thus such voltage exactly as much as the variation in the induction voltage is impressed to the base voltage.

Figure 4A:
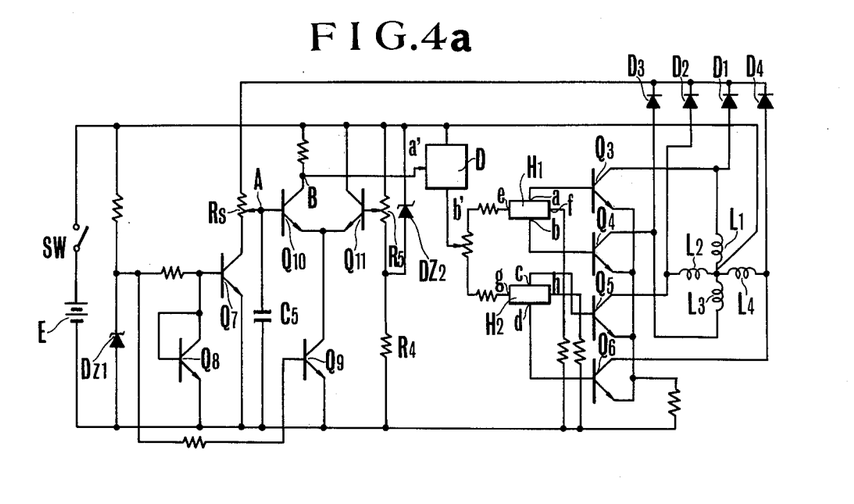
FIG. 4(a) is a circuit diagram to show a modification of the example shown in FIG. 3.
Figure 4B:
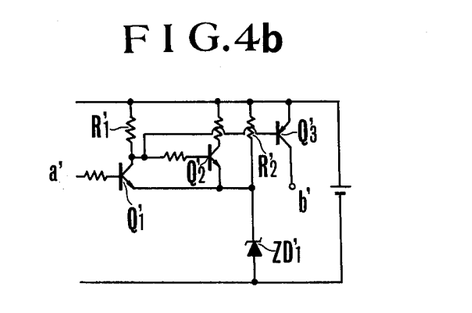
FIG. 4(b) is a circuit diagram to show the detailed arrangement of the pulse generation circuit of FIG. 4(a).

FIG. 4 is an example of a circuit which detects the output voltage of the differential amplifiction circuit shown in FIG. 4(a) to control a Hall motor by a pulse generation circuit D which generates pulse signal corresponding to the above mentioned output voltage. In this drawing such parts as having the same set-ups and the same operating function as those in the example of FIG. 3 are identified by the same number or letters. FIG. 4(a) is a circuit diagram to show detailed step-up of the pulse generating circuit D of FIG. 4(a).

In this drawing, Q' is a transistor, which has its base connected to the terminal a in FIG. 4(a), its collector connected to the power source through the resistance R', and its emitter connected to the Zener diode ZD', for detecting the output voltage of the differential amplification circuit. $Q'_2$ is a transistor, which has its base connected to the collector of the transistor Q', its emitter connected to the Zener diode ZD', and its collector connected to the power source. $Q'_3$ is an output transistor, which has its base connected to the collector of the above mentioned transistor Q', its emitter connected to the power source, and its collector to the point "b" of FIG. 4(a).

Next, explanations will be made on the function of the example shown in FIG. 4. Since the function of the example of FIG. 4 is the same as that of the example of FIG. 3 except the function of the pulse generator D, explanations will be limited to the pulse generator D. As the voltage at the point "a'" lowers when the rotation speed of the motor becomes faster than the reference rotation speed, the transistor Q' becomes OFF, $Q'_2$ becomes ON, while $Q_3$ becomes OFF, and current flowing to the Hall elements $H_1$, $H_2$ will be stopped. By this, the rotation speed of the motor is lowered and is so controlled as keeping a predetermined speed. Contrary to this, when the rotation speed of the motor becomes slower than the reference speed the electric potential at the point "a'" goes up to place the transistor Q' ON, $Q'_2$ OFF and $Q'_3$ ON, making the period of time supplying current to the motor longer, thus the rotation speed of the motor goes up and is controlled to a predetermined speed.

Figure 5:
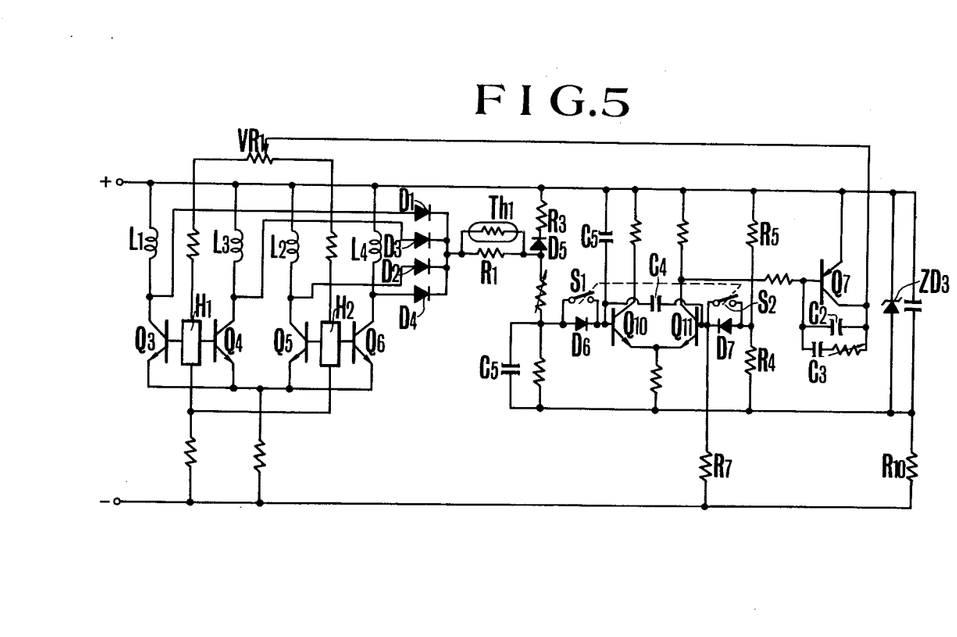
FIG. 5 is a circuit diagram to show another example of a Hall motor control circuit according to the present invention.

FIG. 5 is a circuit diagram to show another example of the Hall motor control circuit according to the present invention, wherein such parts which have the same set-up and function as those of the example shown in FIG. 3 are identified with the same numbers and letters, but a parallel circuit of the resistance $R_1$ and the thermister $Th_1$ is connected to the cathode terminals of the diodes $D_1$ to $D_4$, and the induction voltage is connected to one connecting point of a bleeder circuit consisting of the resistance $R_3$, balister diode $D_5$, etc., being connected to one of the input terminal of the differential amplification circuit through said parallel circuit. The balister diode $D_5$ is for temperature compensation to compensate the variation by temperature of the input voltage of the differential amplification circuit together with said thermister $Th_1$. Diodes $D_6$, $D_7$ and switches $S_1$, $S_2$ are provided in series, respectively with bases of the transistors, $Q_{10}$, $Q_{11}$ which form said differential amplification circuit. Said diodes $D_6$, $D_7$ and switches $S_1$, $S_2$ are to change over the input level into $Q_{10}$, $Q_{11}$ by combination of change over of the switches $S_1$, $S_2$, for obtaining various rotation speed. $Q_{11}$ is an output transistor having its base connected to the collector of the transistor $Q_{11}$ of the differential amplification circuit. The collector of $Q_{11}$ is connected to the input terminals of the Hall elements $H_1$, $H_2$ through the variable resistance $VR_1$ for correcting unbalance caused by irregularity of the device. $ZD_3$ is a Zener diode for compensating the variation in the power source voltage. The resistance $R_7$ is a resistance with high resistance value being connected to the base of the transistor $Q_{11}$ which forms the differential amplification circuit. The resistance $R_7$ is to compensate slight variation by the variation in the power source voltage of the above mentioned Zener diode $ZD_3$. Next, explanations will be made on the function of the control circuit shown in FIG. 5.

When direct current power source is connected to the terminals (+)(−), hall voltage is generated in either one of the output terminals of the Hall elements $H_1$, $H_2$ as has been explained in detail in the example shown in FIG. 3, and one of the transistors $Q_1$ to $Q_4$ corresponding to said Hall voltage becomes ON, thus driving current flows to the field winding corresponding thereto, to rotate the motor. The induction voltage generated at the field winding during such period of time that driving current is not flowing is synthesized by the rotation of the motor, generating such voltage as corresponding to the rotation speed of the motor at its output terminal. And control current flows by said voltage through the resistance $R_1$, the thermister $Th_1$, the balister diode $D_5$ and the resistance $R_3$. This circuit has its temperaure characteristics sufficiently compensated by the co-working function of the thermister and the balister, therefore, such voltage as corresponding to the rotation speed of the motor is generated at both ends of $R_3$. Now, if the rotation of the motor is lowered by some reason, the output of the diode synthesized circuit will be lowered thereby. By this the voltage at both ends of $R_3$ is lowered and the input electric potential of the transistor $Q_{10}$ of the differential circuit is lowered. Therefore, the collector electric potential of $Q_{11}$ goes up and is impressed to $VR_1$ through $Q_7$, and the input electric potential of the hall elements $H_1$, $H_2$ becomes higher. By this, the Hall voltage output increases, and the current of the driving circuit controlled thereby increases to accelerate the rotation of the motor. Comparative voltage being sufficiently stabilized by the Zener diode $ZD_3$, etc. is inputted into the base of $Q_{11}$ of the differential circuit, therefore, the input of $Q_{10}$ of the differential circuit varies by an increase of the motor rotation thus the circuit is automatically placed in balanced state. By this, the motor is to make constant rotation with prescribed speed. In the above mentioned circuit, in the present invention, as shown in the drawing, diodes $D_6$, $D_7$ and switches $S_1$, $S_2$ to open and close the both ends thereof are provided at the base circuit of $Q_{10}$, $Q_{11}$ and the number of the diodes $D_6$, $D_7$ are suitably selected and the switches $S_1$, $S_2$ are suitably changed over for controlling the base voltage being impressed to the transistors $Q_{10}$, $Q_{11}$, thereby a desired level of constant speed can be set. Capacitors $C_4$, $C_5$ are smoothing capacitors to remove ripple which is contained in the induction voltage synthesized by the diodes $D_1$ to $D_4$, as shown in FIG. 2(b). By this capacitors the voltage corresponding to the rotation speed of the motor being impressed to the base of the transistor $Q_{10}$ which constitutes a differential amplification circuit is made to become smoothed voltage not including ripple, to stabilize the function of the differential amplification circuit.

Figure 6:
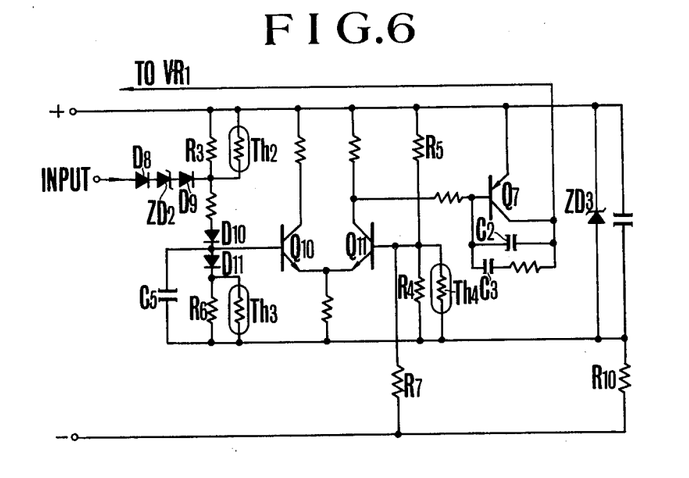
FIG. 6 is a circuit diagram to show a modification of the example of FIG. 5.

FIG. 6 shows a modification of the example of FIG. 5, and the parts having same set-up and function as those in the example of FIG. 5 are identified by same letters and numbers. In this drawing, the motor driving part is omitted because it is same as that in FIG. 5, but input voltage is impressed to a bleeder circuit constituting an input circuit of a differential amplification circuit through diodes, Zener diode, $D_8$, $ZD_2$, $D_9$ being connected in series with the output terminal of the diodes $D_1$ to $D_4$ (shown in FIG. 5) which synthesizes induction voltage, to compensate the variation in the input voltage by the effect of variation in magnetic flux of the rotor caused by temperature variation by the temperature characteristics of the diodes, and at the same time, thermisters $Th_3$, $Th_4$ are connected in parallel with and diodes $D_{10}$, $D_{11}$ are connected in series with the resistances $R_4$, $R_6$, respectively, which compensates the effect on the input voltage by temperature and constitutes the input circuit, for compensating the effect by temperature on the differential amplification circuit.

Figure 7:
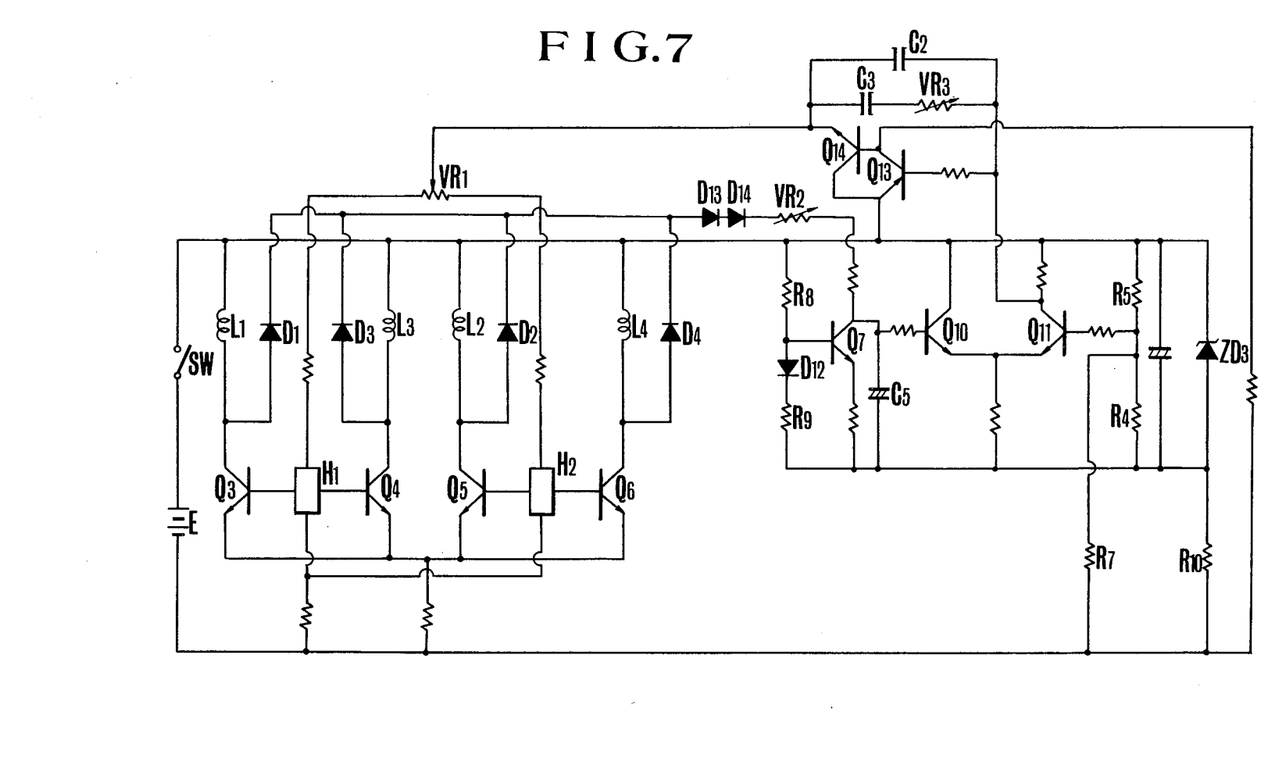
FIG. 7 is a circuit diagram to show another example of the present invention.

FIG. 7 is a circuit diagram to show another example of the present invention, wherein the parts having same set-up and function as those shown in the example of FIG. 3 are identified with same letters and numbers. Difference in the set-up in the example of FIG. 7 from that of the example of FIG. 3 will be explained. $D_{13}$, $D_{14}$ are diodes being connected in series with the common terminals of the diodes to synthesize the induction voltage. $Q_7$ is a transistor, having its base connected to the connecting point between a resistance $R_8$ and a diode $D_{12}$, out of the resistance $R_8$, a resistance $R_9$ and the diode $D_{12}$, being connected in parallel with the Zener diode $ZD_3$, so that a prescribed level of voltage can be impressed. The collector of said transistor $Q_7$ is connected to the above mentioned diodes $D_{13}$, $D_{14}$ through the variable resistance $VR_2$, so that a prescribed level of current always flows to the variable resistance $VR_2$. $R_7$ is a resistance, which is connected to between the base of the transistor $Q_{11}$ constituting the differential amplification circuit and the (−) pole of the power source and has high resistance value. This resistance $R_7$ is to compensate the voltage variation of the above mentioned Zener diode $ZD_3$ by the voltage drop generated as current flows through said resistance when the voltage at both ends of the Zener diode $ZD_3$ varies. $Q_{13}$, $Q_{14}$ are transistors being concatenated, and the base of the transistor $Q_{13}$ is connected to the collector of the transistor $Q_{11}$ which forms the above mentioned differential amplification circuit, for forming the output amplification circuit of the differential amplification circuit. $C_2$, $C_3$, $VR_3$ are capacitors and a variable resistance, and constitute a damper circuit and their input terminals are connected to the collector of the transistor $Q_{11}$ of the differential amplification circuit, while their output terminals are connected to the emitter of the transistor $Q_{14}$, for eliminating alternating current element by ripple contained in the output signal of the differential amplification circuit so that the voltage under the effect of the ripple will not be impressed to the Hall elements $H_1$, $H_2$.

Next, explanations will be made concerning the function of FIG. 7. The explanations will be made on the difference from the example of FIG. 3 as the function of the circuit in FIG. 7 is almost same as that of FIG. 3. When the power source switch is made ON a prescribed level of voltage is impressed to both ends of the Zener diode $ZD_3$, and a prescribed level of voltage is impressed to the bases of the transistors $Q_7$, $Q_{11}$. By this, a prescribed level of current flows to the transistor $Q_7$, and the voltage drop in the variable resistance $VR_2$ will become always constant irrespective of induction voltage. Also, since such value as adding the power source voltage and the induction voltage corresponding to the rotation speed of the motor together is generated at the common terminal of the diodes $D_1$ to $D_4$, the base electric potential of the transistor $Q_{10}$ becomes to have such value as voltage level shifting the value which is obtained by adding the power source voltage and the induction voltage, thus it is held within the operating voltage of the differential amplification circuit and it has such value as exactly corresponding to the induction voltage value. When the induction voltage is greater than a prescribed value, that is when the motor has higher rotation speed than the reference speed, the base electric potential of the transistor $Q_{10}$ becomes higher than the base electric potential of $Q_{11}$. Therefore, the base electric potential of the transistor $Q_{13}$ becomes high, thus the amount of current flowing to the Hall elements decreases, and the rotation speed of the motor becomes slower as in the circuit shown in FIG. 3 and is so controlled as to take constant value always. In a series of control process mentioned above, the voltage of the collector of the transistor $Q_{11}$ contains alternating current element because of the ripple by the induction voltage, but as the ripple element is detected by the damper circuit consisting of the capacitors $C_2$, $C_3$ and the variable resistance $RP_3$ and the ripple element is removed from the voltage being outputted to the output terminal of the transistor $Q_{14}$, therefore, smoothed voltage will be impressed to the hall elements thus the circuit is stabilized and oscillation can be prevented. Diodes $D_{13}$, $D_{14}$ are for temperature compensation preventing such defects that when the magnetic flux of the rotor varies by the effect of temperature its induction voltage varies thus the input voltage corresponding to correct rotation speed will not be inputted into the differential amplification circuit.

Figure 8:
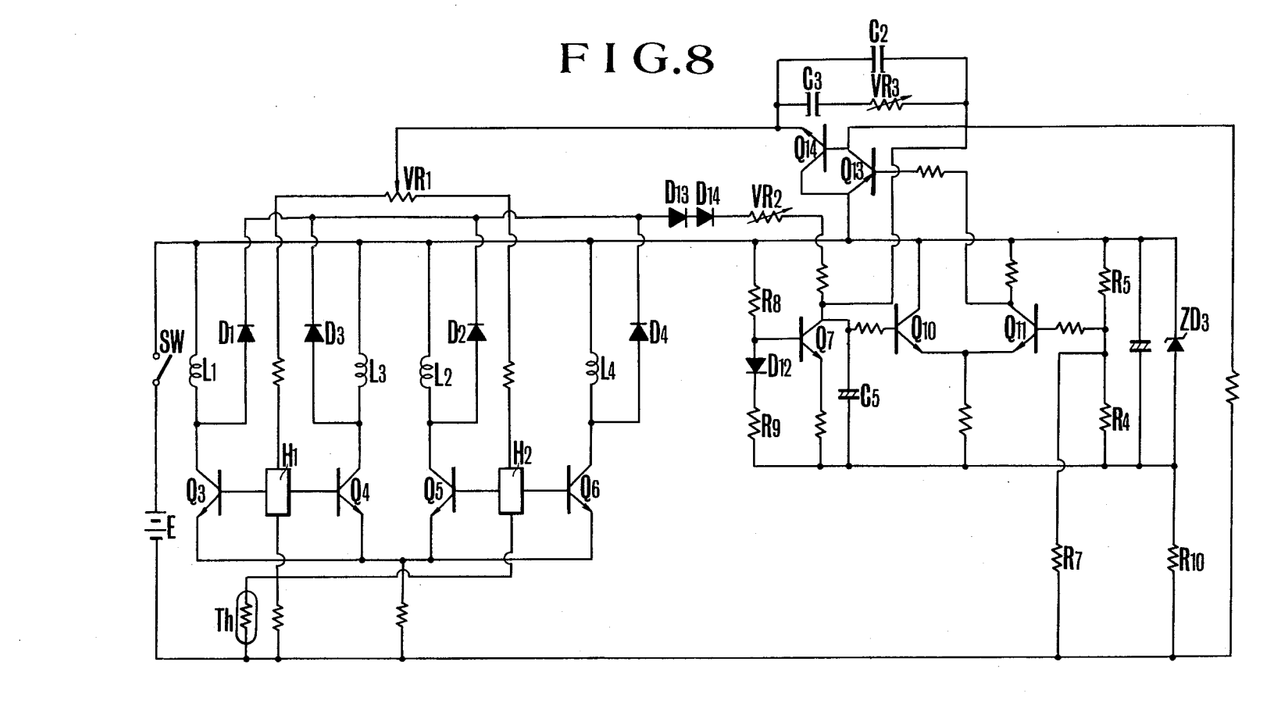
FIG. 8 is a circuit diagram to show a modification of the example shown in FIG. 7.

FIG. 8 is a modification of the example shown in FIG. 7, and the parts having the same arrangement and operating function as those of the example of FIG. 7 are identified by the same letters and numbers, but it differs from FIG. 7 in that the damper circuit is connected to between the collector of the transistor $Q_{11}$ and the emitter of the transistor $Q_{14}$. Since the function of FIG. 8 is same as that of FIG. 7, its explanations will be omitted.

Figure 9:
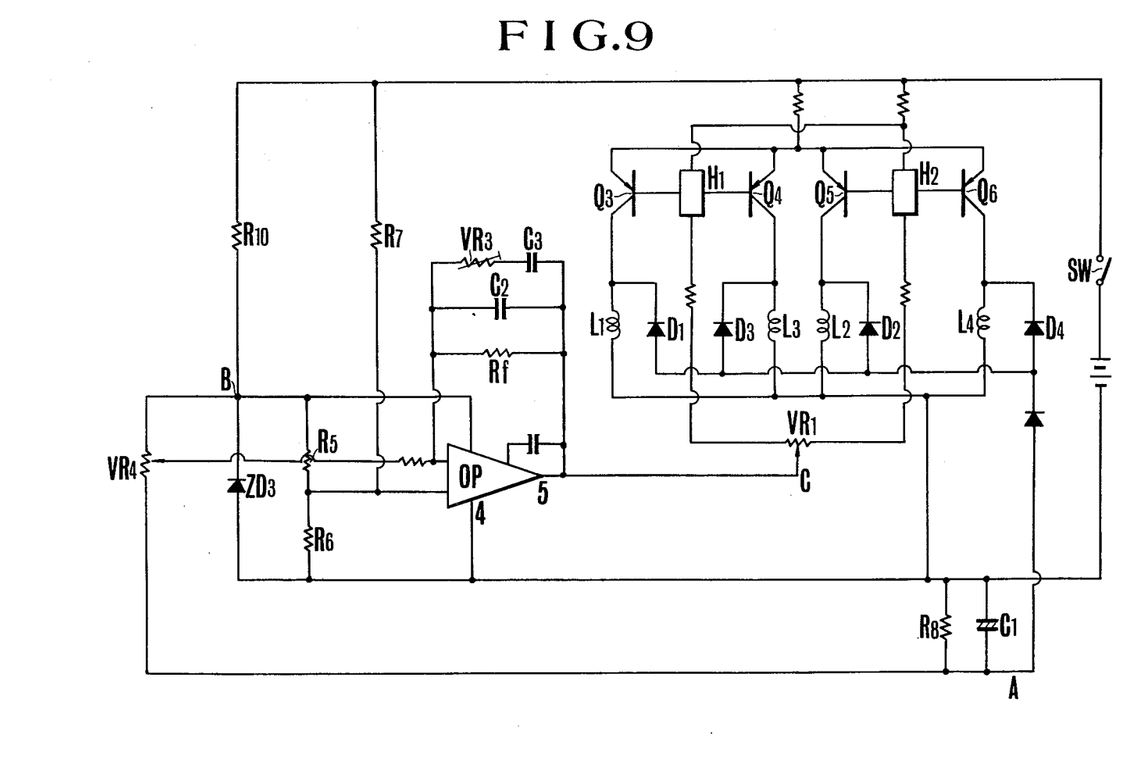
FIG. 9 is a circuit diagram to show still another example of the present invention.

FIG. 9 is a circuit diagram to show another example of the Hall motor control circuit according to the present invention, and while the parts having same set-up and function as those in the example in FIG. 3 are identified with same letters and numbers, it differs in that PNP type transistor is used in this example and an operation amplifier is used in the comparative circuit. Next function of the example in FIG. 9 will be explained.

When the power source switch SW is made ON, current flows to the hall elements $H_1$, $H_2$, and driving current flows to the field windings $L_1$ to $L_4$ by placing any one of the transistors $Q_3$ to $Q_6$ in ON state, and the rotor starts rotation. As the rotor starts rotation, such induction voltage is generated as corresponding to the rotation speed of the rotor and said induction voltage is synthesized by the diodes $D_1$ to $D_4$ being in exactly same manner as in previously mentioned other examples, but since PNP type transistor is used the voltage generated at the point A will be lower as much as the induction voltage than the (−) electric potential of the power source voltage. When the rotation speed of the rotor that is the rotation speed of the motor is faster than the reference speed the voltage at the point t will be lower than the voltage when the motor is rotated at the reference speed. Said voltage is smoothed by the capacitor to impress such electric potential as corresponding to the rotation speed of the motor to the negative input terminal of the operation amplifier. That is, since the electric potential at the point B is always keeping a prescribed level by the Zener diode $ZD_3$, the induction voltage and the bleeder voltage of the voltage at the point B will be impressed to the negative input terminal of the operation amplifier. And low voltage will be impressed when the induction voltage is large. On the other hand since such prescribed voltage as corresponding to the reference rotation speed and as dividing the voltage at both ends of the Zener diode $ZD_3$ by the resistances $R_5$, $R_6$ is always impressed to the positive input terminal of the operation amplifier OP, such voltage as being the difference between the reference rotation speed and the rotation speed of the motor will be generated at the output terminal of the operation amplifier OP. That is, when the rotation speed of the motor is faster than the reference speed the output voltage of the operation amplifier OP becomes high while current flowing to the Hall elements $H_1$, $H_2$ decreases, as a result the driving current flowing to the field windings $L_1$ to $L_4$ decreases. Therefore, the rotation speed of the motor is decreased and is so controlled as to have a prescribed rotation speed. Capacitors $C_2$, $C_3$ and variable resistance $VR_3$ are a damper circuit to serve for eliminating the ripple element contained in the induction voltage.

As has been explained above, in the hall motor control circuit according to the present invention, when the voltage corresponding to the reference rotation speed of motor and the voltage corresponding to the actual rotation speed of the motor are compared, such set-up is employed that the reference voltage with a prescribed level is used as the voltage corresponding to the reference rotation speed of the motor against the electric pole being connected to the power source of the field winding, while the voltage corresponding to the actual rotation speed of the motor is made to be outputted to said electric pole, and these voltages are inputted to the differential amplification circuit, therefore, always correct comparison can be made without being affected by the variation in the power source voltage, furthermore, compensation can be made against the variation in temperature without providing special compensation circuit, thus the invention has great effect in the control circuit of hall motor.

What is claimed is:

1. A DC motor and control system therefor comprising:
   a. a first and second terminal for having a source of electrical power supplied thereto,
   b. a rotor having magnetic poles of opposite polarities thereon,
   c. a stator having field windings positioned in torque-producing relation to said rotor, wherein a first end of each of said windings is coupled to the first power source terminal, generating an induction voltage which corresponds to the rotation speed of said rotor at a second end of each of said windings,
d. a detecting means, which is connected to the second end of each of said windings detecting and synthesizing the induction voltage of each of the windings,
e. an input means for reference rotation speed information, which is coupled to said terminal of said power source for providing as an output a prescribed level of voltage corresponding to a standard rotation speed of the motor,
f. a voltage level shifting means, which is coupled to said detecting means to produce an output voltage shifted to a constant voltage level from the output voltage of the detecting means,
g. a comparator means, which consists of a differential type amplification circuit having two input terminals, wherein one of the input terminals is connected to said voltage level shifting means while the other input terminal is connected to the input means for the reference rotation speed information so as to provide a signal representing the difference between said two inputs,
h. Hall generators positioned in flux-sensing relationship to said magnetic poles, an input terminal of the Hall generator being connected to an output terminal of said comparator means, and wherein an input voltage which corresponds to the output voltage of the above mentioned comparator means is impressed and a Hall voltage which corresponds to said input voltage is generated, and
i. a driving control means connected to the output of Hall generators and said stator windings, for applying exciting current to said windings in response to the output voltage of said Hall generators.

2. A DC motor and control system therefor according to the claim 1, in which said voltage level shifting means has a constant current circuit and a bleeder circuit having a potentiometer being connected in series thereto, wherein said potentiometer is connected to one of the input terminals of said differential type amplification circuit.

3. A DC motor and control system therefor according to the claim 1, in which said voltage level shifting means contains a bleeder circuit including a plural number of resistances being connected together in series, wherein the connecting points of said resistances are connected to one of the input terminals of said differential type amplification circuit.

4. A DC motor and control system therefor according to the claim 3, in which said bleeder circuit contains a variable resistance, and said variable resistance is connected in series with the resistance of said bleeder circuit, wherein the rotation speed of motor is varied by change over by setting the resistance value of the variable resistance.

5. A DC motor and control system therefor according to the claim 1, in which the comparator means contains semi-conductor elements being connected in series, wherein said semi-conductor elements are connected between one of the input terminals of the above mentioned differential amplification circuit and the above mentioned input means of reference rotation speed information and between the other input terminal of the differential amplification circuit and the voltage level shifting means, and the number of said elements is suitably changed over for varying the rotation speed of the motor.

6. A DC motor and control system therefor according to the claim 1, in which said detecting means contains a plural number of diodes being connected in series with the output terminal of said detecting means, wherein said plural number of diodes being connected inseries are connected between said voltage level shifting means and said detecting means or compensating the variation in the input voltage of said voltage level shifting means derived from temperature variation.

7. A DC motor and control system therefor comprising:
a first and second terminal for having a source of electrical power supplied thereto,
a rotor having magnetic poles of opposite polarities thereon,
a stator having field windings positioned in torque-producing relation to said rotor, wherein a first end of each of said windings is coupled to the first power source terminal to generate an induction voltage which corresponds to the rotation speed of the rotor,
a detecting means which is connected to the second ends of said windings to detect and synthesize the induction voltage,
a constant voltage means, which is connected to one of the power source terminals to always supply electric potential of a substantially constant voltage to said terminal,
an input means for rotation speed information, which is connected to said detecting means and to the output terminal of the constant voltage means, to supply a voltage which corresponds to the rotation speed of the motor,
g. an input means for reference rotation speed information which is connected to the both ends of the above mentioned constant voltage means to output a constant voltage which corresponds to the reference rotation speed of the motor,
h. a comparator means, which includes a differential type amplification circuit having two input terminals, wherein one of said input terminals is connected to said input means for rotation speed information, while the other input terminal is connected to the input means for the reference rotation speed information so as to provide a signal representing the difference between said two inputs,
i. Hall generators positioned in flux-sensing relationship to said magnetic poles, wherein an input voltage which corresponds to the output voltage of said comparator means is impressed and such Hall voltage which corresponds to said input voltage is generated, and
j. a driving control means connected to the output of Hall generators and said stator windings, for applying exciting current to said windings in response to the output voltage of said Hall generators.

8. A DC motor and control system therefor according to the claim 7, in which said differential type amplification circuit contains a high impedance means, one end of which is connected to the connecting point between the input terminal of said differential amplification circuit and said input means of reference rotation speed information, while the other end of said high impedance means is connected to a second power source terminal.

9. A DC motor and control system therefor according to the claim 7, in which said comparator means contains a capacitor, which is connected between both input terminals of said differential type amplification circuit.

10. A DC motor and control system therefor according to the claim 9, in which said capacitor is connected between the input terminal of said differential type amplification circuit and said second power source terminal.

11. A DC motor and control system therefor according to the claim 7, in which said comparator means contains an output transistor circuit and a damper circuit consisting of capacitors and resistances, wherein said output transistor and damper circuit are connected between the output terminal of said differential amplification circuit and the input terminals of said Hall generators to eliminate ripple generated at the output terminal of the differential type amplification circuit.

12. A DC motor and control system therefor according to claim 7, in which said comparator means contains a pulse signal generation means, which is connected between the output terminal of said differential type amplification circuit and the input terminals of said Hall generators, to generate a rectangular wave signal with a pulse width which corresponds to the output of said differential type amplification circuit for controlling duty cycle of the input of the Hall generators by the output of said pulse signal generation means.

13. A DC motor and control system therefor according to the Claim 7, in which said differential type amplification circuit is an operational amplifier.

14. A DC motor and control system therefor according to the claim 13, in which said operational amplifier contains a damper circuit consisting of capacitors and resistances, wherein said damper circuit is connected to the reverse input terminal and the output terminal of said operational amplifier.

15. A DC motor and control system therefor comprising:
 a power source,
 a rotor having magnetic poles of opposite polarities thereon,
 a stator having flux-producing windings positioned in torque-producing relation to said rotor, wherein one end of each of said windings is connected to said power source, generating induction voltage corresponding to rotation speed of said rotor,
 a detecting means connected to the other end of each of said flux-producing windings for detecting and synthesizing said induction voltage of each of the windings,
 a voltage level shifting means connected to the detecting means to produce an output voltage shifted to a constant voltage level from the output voltage of the detecting means,
 reference rotation speed voltage producing means for producing a reference voltage corresponding to a standard rotation speed of said rotor,
 a comparator means, consisting of a differential type amplification circuit having two input terminals, wherein one of the input terminals is connected to said voltage level shifting means while the other input terminal is connected to said reference rotation speed voltage producing means so as to provide an output signal representing the difference between said two inputs,
 h. Hall generators positioned in flux-sensing relationship to magnetic poles, generating a Hall voltage corresponding to said output signal of said comparator means; and
 i. a driving control means connected to the output of Hall generator and said windings for applying exciting current to said windings in response to the output voltage of said Hall generators.

\* \* \* \* \*